United States Patent
Corron et al.

(10) Patent No.: US 12,086,570 B2
(45) Date of Patent: Sep. 10, 2024

(54) ACTIVELY STABILIZED RANDOM NUMBER GENERATOR

(71) Applicant: USA as represented by the Secretary of the Army, Washington, DC (US)

(72) Inventors: Ned J Corron, Madison, AL (US); Jonathan N Blakely, Madison, AL (US)

(73) Assignee: United States of America, as represented by the Secretary of the Army, Washington, DC (US)

( * ) Notice: Subject to any disclaimer, the term of this patent is extended or adjusted under 35 U.S.C. 154(b) by 623 days.

(21) Appl. No.: 17/209,680

(22) Filed: Mar. 23, 2021

(65) Prior Publication Data

US 2022/0308836 A1    Sep. 29, 2022

(51) Int. Cl.
G06F 7/58    (2006.01)

(52) U.S. Cl.
CPC .................................. G06F 7/588 (2013.01)

(58) Field of Classification Search
CPC .............................................. G06F 7/58–588
See application file for complete search history.

(56) References Cited

U.S. PATENT DOCUMENTS

| | | | |
|---|---|---|---|
| 2002/0035586 A1* | 3/2002 | Szajnowski | G06F 7/58 708/250 |
| 2003/0050943 A1* | 3/2003 | Ikeda | G06F 7/588 708/3 |
| 2012/0045053 A1* | 2/2012 | Qi | H04L 9/0662 380/252 |

FOREIGN PATENT DOCUMENTS

WO    WO-2008016337 A1 *    2/2008 ............... G06F 7/58

OTHER PUBLICATIONS

Corron, Ned, Marko Milosavljevic, and Jon Blakely. 2017. "True Random Source from Integratable Chaotic Circuits." IMAPSource Proceedings 2017 (DPC): 1-26. https://doi.org/10.4071/2017DPC-WP3A_Presentation1. (Year: 2017).*
Ned J. Corron, Shawn D. Pethel, and Krishna Myneni, "Synchronizing the information content of a chaotic map and flow via symbolic dynamics" Oct. 2002 Physical Review E 66(3 Pt 2A):036204, DOI:10.1103/PhysRevE.66.036204 (Year: 2002).*
A. N. Beal, J. N. Blakely, N. J. Corron, R. N. Dean Jr. "High frequency oscillators for chaotic radar" Proceedings vol. 9829, Radar Sensor Technology XX; 98290H (2016), https://doi.org/10.1117/12.2223818, Event: SPIE Defense + Security, 2016, Baltimore, MD, United States, May 12, 2016 (Year: 2016).*

* cited by examiner

Primary Examiner — Matthew D Sandifer
(74) Attorney, Agent, or Firm — Karen G. Hazzah

(57) ABSTRACT

An actively stabilized random number generator includes a random number generator and a feedback controller. The random number generator includes a chaotic physical circuit realizing an iterated function. The iterated function is configured to produce a trajectory of iterates and has an operating parameter β and a desired Markov operating point. A binary bit converter has a symbol function configured to produce binary symbols from the trajectory of iterates and a maximal kneading sequence. The feedback controller is configured to observe the maximal kneading sequence within the trajectory of iterates and adjust the operating parameter to the desired Markov operating point.

8 Claims, 3 Drawing Sheets

ACTIVELY STABILIZED RANDOM NUMBER GENERATOR

FIELD

The present disclosure generally relates to cryptography, and more specifically, to random number generation via chaotic physical systems.

BACKGROUND

Random numbers are used in a multitude of fields such as encryption, computer simulations, artificial scene generation, and gambling. Most devices that are used to generate random numbers are pseudo-random number generators (PRNGS). However, PRNGS are not true-random because they are based on systems and/or algorithms with inherent, and thus determinable, patterns. For applications such as encryption, true-random generation is important to securing communication. Otherwise, deviation from true-random generation creates potential for said encryption to be "broken" (i.e., the random number generator possesses exploitable vulnerability). For example, private communication, data sharing, and commerce are just a few applications where unbreakable encryption is becoming increasingly important.

Currently, devices generating true-random numbers often rely on special equipment based on quantum uncertainty or complex chaotic classical dynamics. However, devices based on quantum uncertainty are costly, slow, and are therefore not suitable for large-scale integration, and devices based on complex chaotic classical dynamics defy complete analysis and can exhibit vulnerabilities due to non-ideal realization. All generators based on physical properties are sensitive to changes in environmental parameters, such as ambient temperature.

Therefore, there is a need for true-random generators without vulnerabilities that have the ability for large-scale integration and are tolerant to environmental change.

BRIEF SUMMARY

An actively stabilized random number generator includes a random number generator and a feedback controller. The random number generator includes a chaotic physical circuit designed to realize an iterated function. The iterated function of the random number generator has a single input state on an interval. The iterated function further includes a single output state being on the same interval. The iterated function is configured to have a trajectory of iterates, wherein each iterate is within the interval. The iterated function having a positive entropy rate, wherein the entropy rate defines a rate at which random information is produced. The iterated function defines a unimodal map, with the unimodal map having a slope configuration. The iterated function has an operating parameter. The operating parameter is on the interval $1<\beta\leq 2$. The operating parameter corresponds with the slope configuration of the unimodal map. The operating parameter corresponding to the entropy rate of the iterated function. The operating parameter has a desired Markov operating point.

BRIEF DESCRIPTION OF DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
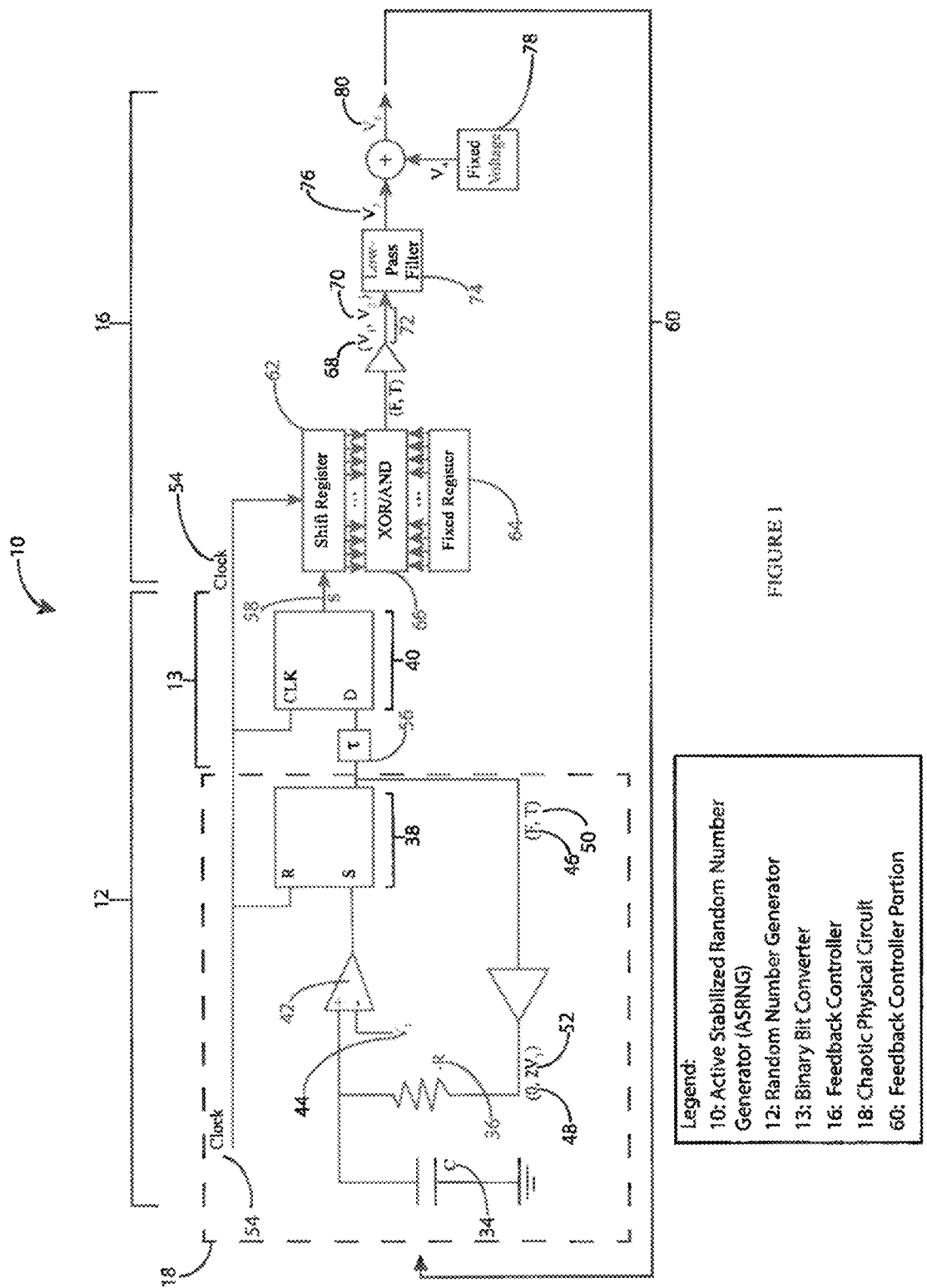
FIG. 1 is a diagram of a chaotic circuit realizing a unimodal map and a feedback controller.

The present disclosure provides an actively stabilized random number generator (ASRNG) 10, as schematically illustrated in FIG. 1. The ASRNG 10 of the present disclosure generates true random outputs for applications such as, but not limited to, encryption, computer simulations, and compressive sensing. As one skilled in the art would know, "true random" outputs are unpredictable whereas "pseudo-random" outputs are deterministic function outputs with suitable statistics designed to mimic true random numbers. As schematically illustrated in FIG. 1, the actively stabilized random number generator 10 has a random number generator 12, a binary bit converter 13, and a feedback controller 16.

Figure 2:
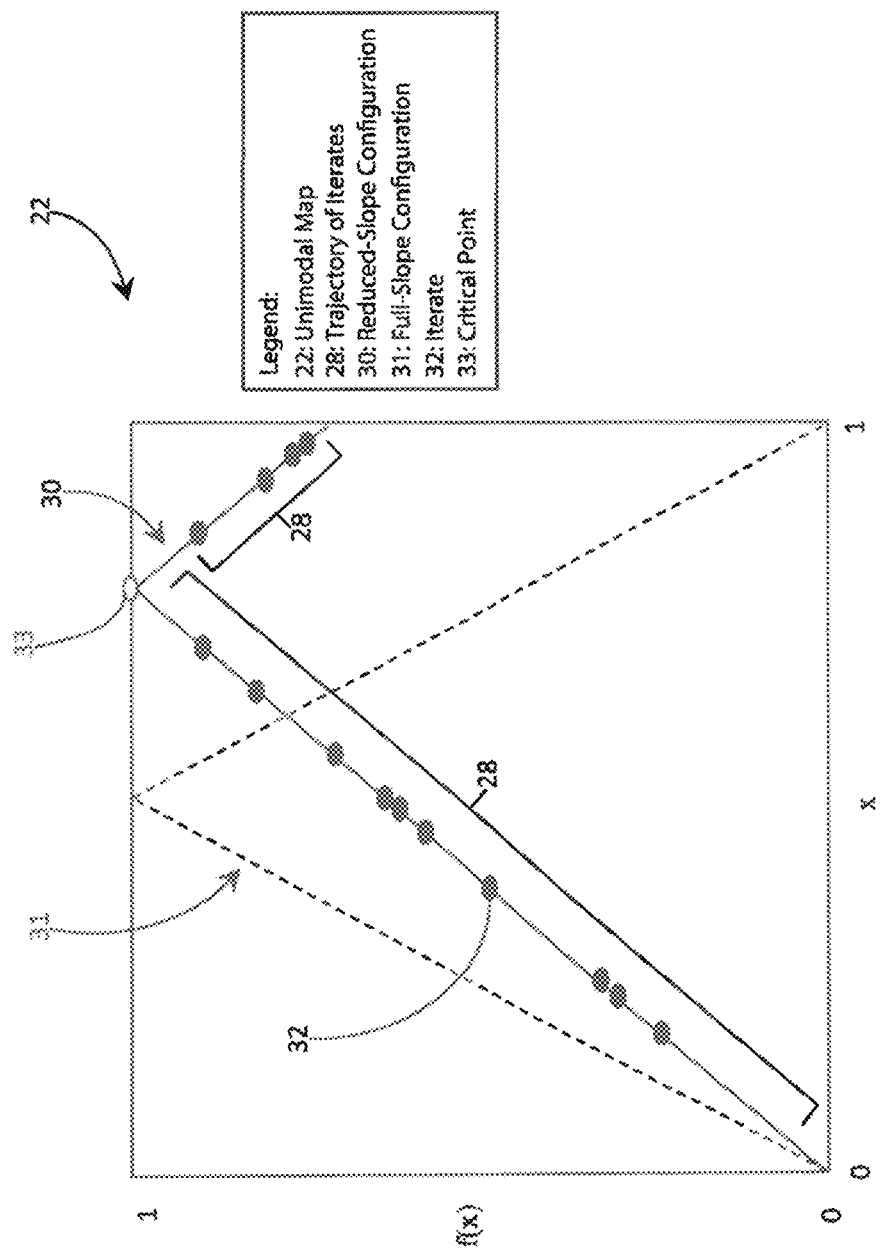
FIG. 2 is a diagram of a unimodal map.

As seen in FIGS. 1 and 2, the random number generator of the ASRNG 10 has a chaotic physical circuit 18, wherein the chaotic physical circuit 18 is constructed to have an iterated function. The iterated function defines a unimodal map 22, the unimodal map being a tent map, and the iterated function has a single input state, a single output state, a trajectory of iterates 28, a positive entropy rate, and an operating parameter.

As seen in FIG. 2, the unimodal map 22 of the iterated function has a reduced-slope configuration 30. As one of ordinary skill in the art would know, a unimodal map 22 may have a full-slope configuration 31, but for the purpose of this disclosure the reduced-slope configuration 30 is realized because the full-slope configuration is structurally unstable. The operating parameter is denoted using the symbol "$\beta$". The operating parameter corresponds with the full-slope configuration 31 and the reduced-slope configuration 30 of the unimodal map 22 and is on the interval $1<\beta<2$. The operating parameter also has a desired Markov operating point. The desired Markov operating point being defined as a corresponding value at which the iterates are considered Markov, or finitely dependent.

In the equation below, the single input state is denoted by the variable "$x_n$", with the subscript "n" denoting an iteration number. Generally, the iteration number represents time. The iterated function is configured to input the single input state and output the single output state. The single input state is on an interval $0 \leq x_n \leq 1$. Each of the single output states create an iterate 32 of the trajectory of iterates 28 of the unimodal map 22, as seen in FIG. 2. The trajectory of iterates 28 are within the same interval of the single input state.

$$x_{n+1} = \beta \cdot \begin{cases} x_n, & x_n \leq 1/\beta \\ 1-x_n, & x_n > 1/\beta \end{cases}$$

As one skilled in the art would know, a different trajectory of iterates 28 can be produced given different initial input states. For example, given two scenarios, the first scenario initial input state has a small difference between an initial input of the second scenario, eventually resulting in vastly differing trajectories. The iterated function results in the trajectory of iterates 28 as the iteration number is increased, wherein the trajectory of iterates 28 define an overall shape of the unimodal map 22, as shown in FIG. 2.

As seen below by the following equation, a rate at which random information is produced by each trajectory of iterates 28 defines the positive entropy rate, denoted by "h", which has units of bits per iteration, and is calculated using the operating parameter:

$$h = \log_2(\beta)$$

In the present disclosure, the value of the operating parameter of the actively stabilized random number generator (ASRNG) 10 is $\beta < 2$, corresponding with the positive entropy rate being h<1 bit per iteration by the equation above.

Each one of the trajectory of iterates 28 are then processed by the binary bit converter 13 of the ASRNG 10. The binary bit converter 13 is configured to have a symbol function defined by the following equation:

$$S_n = \begin{cases} 0, & x_n \leq 1/\beta \\ 1, & x_n > 1/\beta \end{cases}$$

The symbol function produces a binary symbol, which is a bit, for each iterate 32 of the trajectory of iterates 28, denoted in the equation above by "$S_n$". Generally, a sequence of bits is produced as the symbol function translates a plurality of iterates of the iterated function as the iterated function increases in iteration number. A natural partition, relative to a critical point 33 of the unimodal map 22, the critical point 33 being configured by the operating parameter, is utilized within the symbol function, resulting in the symbol function having a symbol rate, which is one bit per iteration. The symbol rate being defined as the rate at which bits are produced via the symbol function. As one skilled in the art would know, the entropy rate cannot exceed the symbol rate, and the amount by which the symbol rate exceeds the entropy rate is due to bias and interdependence in binary symbols produced by the binary bit converter 13. Methods to remove bias from the binary symbols are known to one skilled in the art. Interdependence, which is defined as a dependence on prior outcomes of the iterated function, results in vulnerability within the ASRNG 10. The vulnerability is mitigated using the feedback controller 16, as described in further detail below.

To be able to generate independent random binary symbols, the feedback controller 16 is integrated into the chaotic physical circuit 18 to correct for interdependence within the ASRNG 10, as a result of the positive entropy rate being h<1 bit per symbol, and to automatically correct for physical deviations due to circuit implementation (e.g., manufacturing defects or environmental changes). The feedback controller 16 exploits the Markov properties associated with the operating parameter utilizing kneading theory. As one skilled in the art would know, kneading theory states that the desired Markov operating point of the operating parameter is defined by a unique maximal kneading sequence. As a result, each iterate 32 of the iterated function is considered Markov and emits random sequences that order less than or equal to its corresponding maximal kneading sequence. The feedback controller 16 observes the maximal kneading sequence within the trajectory of iterates 28 to determine if the operating parameter needs to be increased or decreased in order to maintain the iterates at the desired Markov operating point, and to compensate for the physical deviations of the chaotic physical circuit 18 that may cause the operating parameter to change. One skilled in the art would know that methods exist for extracting random bit sequences without bias and interdependence from the system with the desired Markov operating point.

Described above is the mathematical construction of the actively stabilized random number generator 10. As previously mentioned, the actively stabilized random number generator 10 can be realized using the chaotic physical circuit 18, as seen in FIG. 1. As one skilled in the art would know, the chaotic physical circuit 18 contains both analog and digital circuitry. The analog circuitry contains a capacitor C 34 and a negative resistor −R 36, as seen in FIG. 1. The practical realization of an electronic negative resistor is known to one skilled in the art. The digital circuitry has a RS flip flop 38 and a clocked D flip flop 40. In addition, the chaotic physical circuit 18 has a comparator 42 for detecting if voltage above the capacitor C 34 exceeds a threshold $V_T$ 44 and a buffer circuit that converts digital to analog voltages where a digital F 46 generates a zero 48, and a digital T 50 generates twice the threshold $2V_T$ 52. An input clock signal 54 is a periodic impulse of a short duration that resets an output of the RS flip flop 38 and loads data into the clocked D flip flop 40. As one skilled in the art would understand, a short delay τ 56 is included between the RS flip flop 38 and the clocked D flip flop 40 to allow the D flip flop to latch the RS flip flop output prior to the RS flip flop's reset via the clock signal 54. As seen in FIG. 1, the chaotic physical circuit 18 outputs a digital signal S 58 and the clock signal 54 which are synchronized, relative to a feedback controller portion 60 of the chaotic physical circuit. The digital signal S 58 exhibits a new random bit with each iterate 32 of the iterated function. Random numbers of the ASRNG system 10 are derived from the unimodal map 22 utilizing the operating parameter. The operating parameter value "β" is derived using the following equation:

$$\beta = \exp\left(\frac{T}{RC}\right)$$

In the equation above, "exp" indicates an exponential function, "T" is a clock period, "R" is a magnitude of a negative resistance, and "C" is a capacitance. The chaotic circuit 18 is designed such that "T" of the clock period is within a parameter of 0<T<RC ln(2). When "R" is the magnitude of the negative resistance is multiplied by "C" is the capacitance and the natural logarithm 2; such that the parameters for the unimodal map 22 are 1<β≤2.

FIG. 1 further shows a schematic illustration of the feedback controller 16 integrated into the chaotic physical circuit 18, forming the feedback controller portion 60 of the chaotic physical circuit. The outputs of the chaotic physical circuit 18 relative to the feedback controller 16 are S 58 and the synchronized clock signal 54 signals, which are then entered into a shift register 62 of the feedback controller portion 60. Random bits that are conveyed on S 58 are converted to a parallel representation using the shift register 62 driven by the clock signal 54. A fixed register 64 stores the maximal kneading sequence corresponding to the desired Markov operating point. A size of the shift register 62 in bits is matched to a size of the fixed register 64 that is required to store the maximal kneading sequence. A parallel output of the shift register 62 is bit-wise compared to the maximal kneading sequence in a XOR/AND block 66 of the feedback controller portion 60. A digital output from a comparison from the XOR/AND block 66 indicates a true state, if and only if, contents of the shift register 62 exactly match the maximal kneading sequence stored in the fixed register 64.

Figure 3:
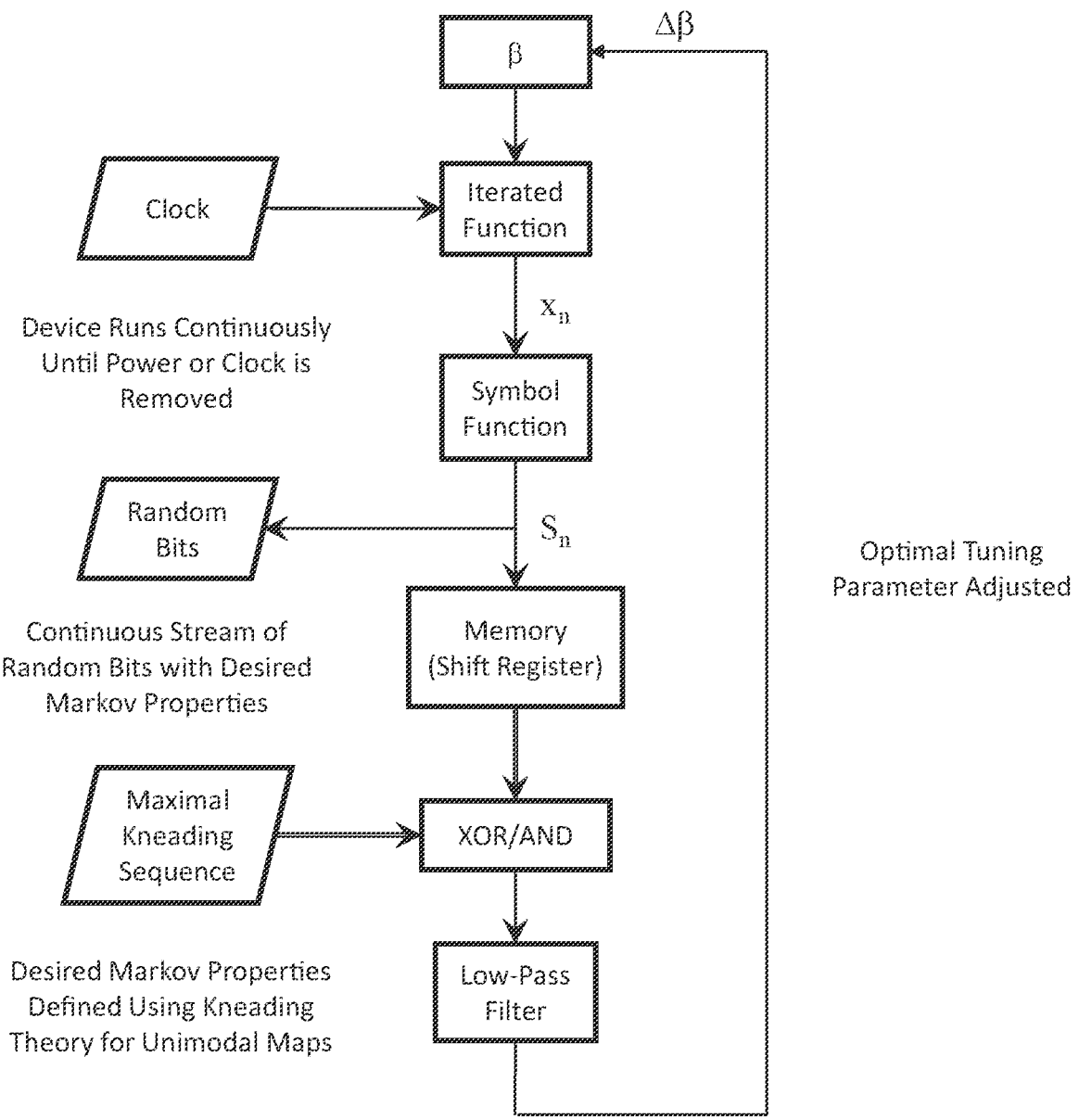
FIG. 3 is a flow chart showing functions performed by the actively stabilized random number generator.

The digital output of the comparison from the XOR/AND block 66 is converted to two analog voltage level signals, with a logical F translating to voltage V1 68 and a logical T to voltage V2 70. These analog voltage level signals are the equivalent of an analog signal 72. The analog signal 72 passes through a low-pass filter 74 with a time constant that is sufficiently long to yield an output voltage V3 signal 76 that is inversely proportional to a relative occurrence of the maximal kneading sequence within a random bit stream. The output voltage $V_3$ signal 76 is added to a fixed voltage $V_4$ 78 that provides a coarse operating point to aid targeting the desired Markov operating point using an output signal $V_F$ 80. The feedback controller 16 output signal $V_F$ 80 can be used to control the operating parameter via voltage control of either the negative resistance −R 36, the capacitance C 34, or a clock period. For purposes of clarity, FIG. 3 schematically illustrates the steps of the ASRNG 10 in accordance with the present disclosure.

The present disclosure provides the chaotic physical circuit 18 that generates random numbers and may be built using readily available electronic parts. Detection of the maximal kneading sequence within the trajectory of iterates 28 of the iterated function provides a built-in diagnostic for monitoring the positive entropy of the random number generator, forming the ASRNG 10.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed:

1. An actively stabilized random number generator comprising:
    a random number generator which generates random symbols based on an iterated function; and
    a feedback controller,
    wherein the random number generator comprises:
        a chaotic physical circuit that comprises both digital and analog circuitry and that realizes the iterated function, the iterated function having a single input state on an interval and a single output state within the interval, the iterated function configured to have a trajectory of iterates, wherein each iterate is within the interval, the iterated function having a positive entropy rate that defines a rate at which random information is produced;
        wherein the iterated function defines a unimodal map, the iterated function having an operating parameter (β) on an interval of $1<β≤2$, the operating parameter determining a slope configuration of the unimodal map, the operating parameter corresponding to the entropy rate of the iterated function, the operating parameter having a desired Markov operating point; and
    wherein the feedback controller is configured to receive an output from the random number generator, to observe a maximal kneading sequence within the trajectory of iterates, and to adjust the operating parameter to the desired Markov operating point.

2. The actively stabilized random number generator of claim 1, wherein the feedback controller is further configured to maintain the operating parameter at the desired Markov operating point.

3. The actively stabilized random number generator of claim 1, wherein the actively stabilized random number generator further comprises a binary bit converter, the binary bit converter realizing a symbol function, the symbol function having a natural partition and a symbol rate, the natural partition being configured to generate the binary symbols, the symbol rate being one binary symbol generated per iteration, the symbol rate being greater than or equal to the entropy rate.

4. The actively stabilized random number generator of claim 1, wherein the slope configuration of the unimodal map is a reduced slope configuration.

5. The actively stabilized random number generator of claim 4, wherein the symbol rate is less than the entropy rate of the chaotic physical circuit.

6. The actively stabilized random number generator of claim 4, wherein the reduced slope configuration has the condition ß<2.

7. The actively stabilized random number generator of claim 1, wherein the slope configuration of the unimodal map is a full height configuration.

8. The actively stabilized random number generator of claim 7, wherein the full slope configuration has the condition ß=2.

* * * * *